Aug. 17, 1965  D. C. HENDRY  3,200,770
OVERHEAD GANTRY CRANE TRUCK
Filed Nov. 28, 1961   7 Sheets-Sheet 1
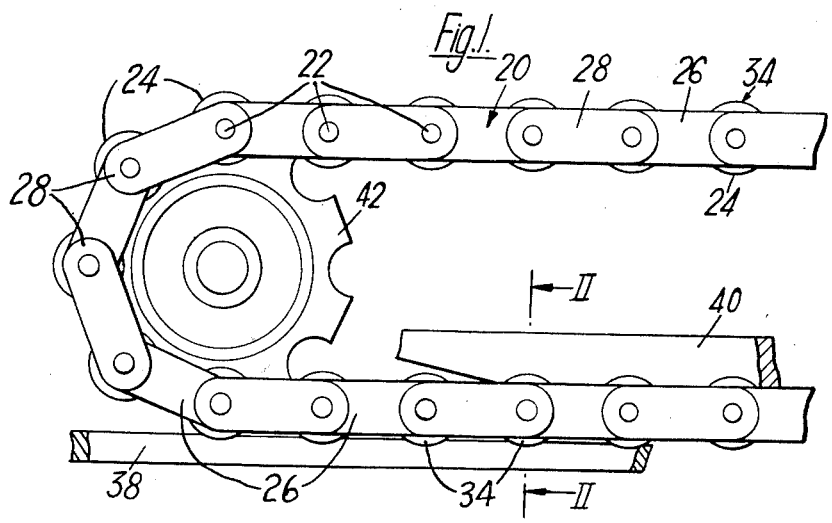
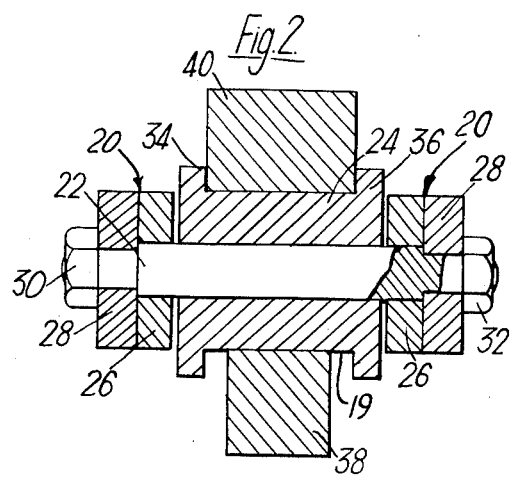
INVENTOR
DAVID CALDER HENDRY
BY
Stevens, Davis, Miller + Mosher ATTORNEYS Aug. 17, 1965 D. C. HENDRY 3,200,770
OVERHEAD GANTRY CRANE TRUCK
Filed Nov. 28, 1961 7 Sheets-Sheet 2
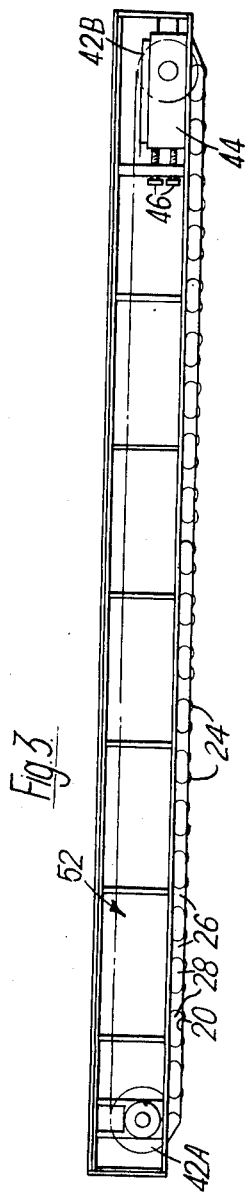
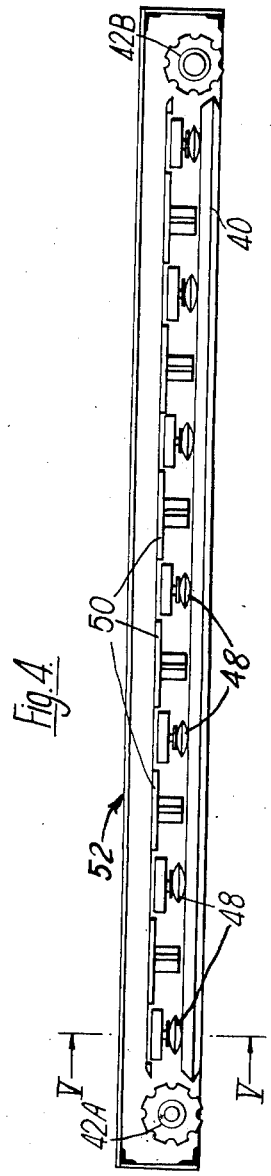
INVENTOR
DAVID CALDER HENDRY
BY
Stevens, Davis, Miller & Mosher ATTORNEYS Aug. 17, 1965  D. C. HENDRY  3,200,770
OVERHEAD GANTRY CRANE TRUCK
Filed Nov. 28, 1961  7 Sheets-Sheet 3
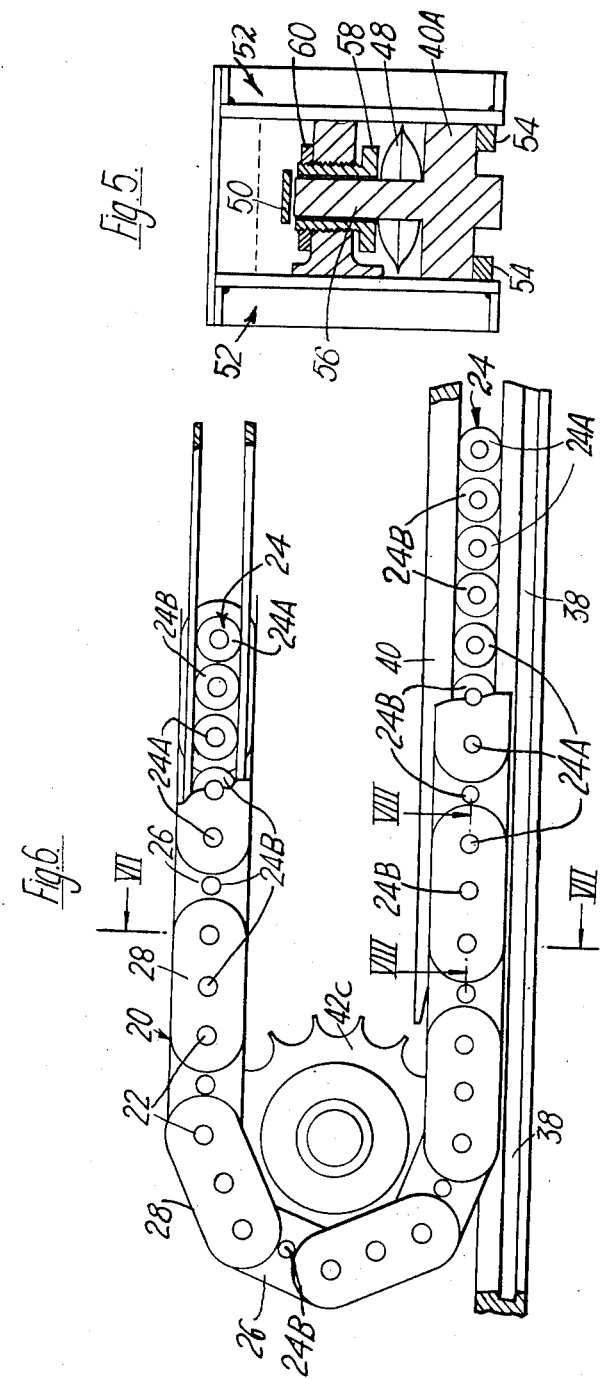
INVENTOR
DAVID CALDER HENDRY
BY
Stevens, Davis, Miller & Mosher ATTORNEYS

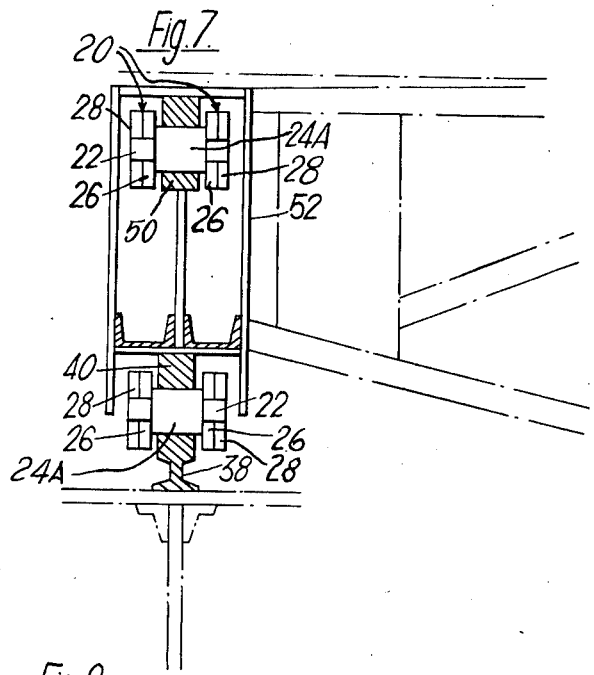
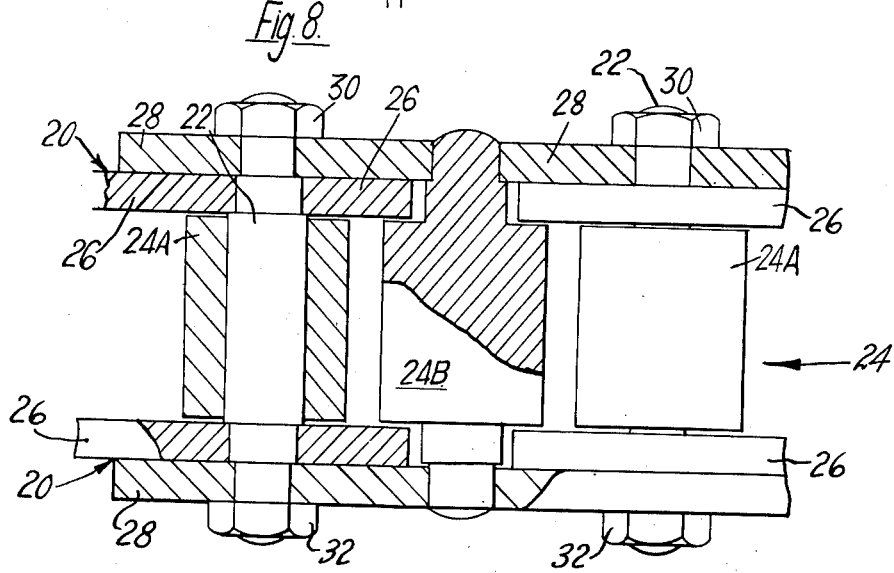

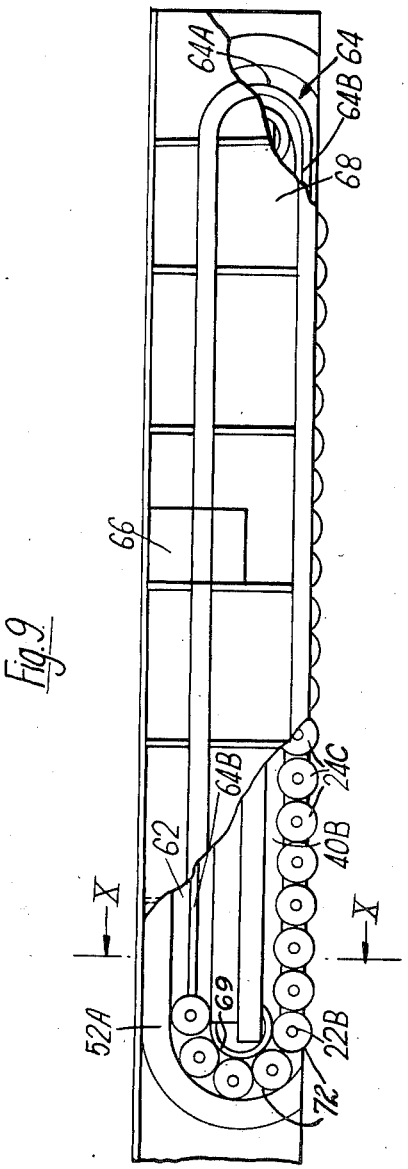

Aug. 17, 1965  D. C. HENDRY  3,200,770
OVERHEAD GANTRY CRANE TRUCK
Filed Nov. 28, 1961  7 Sheets-Sheet 6

INVENTOR
DAVID CALDER HENDRY
BY
Stevens, Davis, Miller & Mosher  ATTORNEY

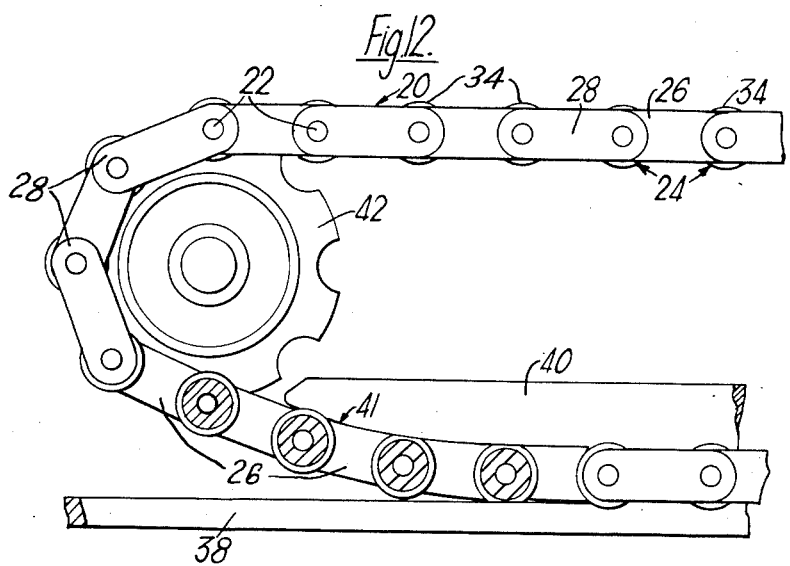

United States Patent Office 3,200,770
Patented Aug. 17, 1965

3,200,770
OVERHEAD GANTRY CRANE TRUCK
David Calder Hendry, Kettering, England, assignor to Stewarts and Lloyds Limited, Glasgow, Scotland
Filed Nov. 28, 1961, Ser. No. 155,296
Claims priority, application Great Britain, Jan. 3, 1961, 279/61
4 Claims. (Cl. 105—163)

This invention relates to rail vehicles, and more particularly to anti-frictional load-carrying means therefor.

Rail vehicles are conventionally borne by wheels, and, especially where heavy rail vehicles are involved, rail joints give rise to severe impacts when the vehicles travel over same. For this reason, it has been customary to use a large number of wheels and to spring load individually the bearings therefor.

The present invention is an anti-frictional load-carrying means adapted for mounting on a rail vehicle, said means comprising a rail (hereinafter referred to as the "vehicle rail") adapted for attachment to the vehicle, and an endless series of rollers whereof the lower length is adapted to pass between and in contact with said vehicle rail and a static or ground rail along which the vehicle is carried. The invention is applicable to vehicles adapted to be carried on a single static or ground rail or monorail, or two or more static or ground rails, there being one vehicle rail and associated endless series of rollers per static or ground rail.

The rollers may be carried on an endless hinged transmission type link chain whereof the links are adapted to embrace said vehicle rail thus to guide the vehicle, or the rollers may be flanged for the same purpose.

The link chain may be entrained at each end about sprockets one or both of which may be idle or driven, and a static profiled curvilinear member may be substituted for any idle sprocket.

The rollers may, alternatively, be flanged and formed with axles and be constrained by a chase and axle races, such constructions concerning non-driven vehicles or non-driven load-carrying stations of otherwise driven vehicles. The flanged and axled rollers may alternate with smaller rollers guided in the axle races only and adapted to rotate in the opposite direction and maintain the flanges of successive main rollers out of contact with one another.

The present invention is also a rail vehicle provided on each side with an anti-frictional load-carrying means as defined in any of the four next preceding paragraphs.

The vehicle rail or rails may be resiliently mounted on the vehicle to enable it or them to conform to any irregularities in the static or ground rail or rails.

Embodiments of the invention will now be described, by way of example, with reference to the accompanying drawings, in which:

FIG. 1 is a fragmentary side elevation of part of an anti-friction load-carrying means in accordance with the invention for supporting a rail vehicle;

FIG. 2 is a local section on the line II—II of FIG. 1;

FIG. 3 is a side elevation of a complete rail vehicle truck, according to a basic embodiment of the invention, with side cover plates in place;

FIG. 4 is a longitudinal section of an entire truck according to a basic embodiment of the invention, omitting the chain and rollers for clarity;

FIG. 5 is a section on the line V—V of FIG. 4 illustrating an alternate embodiment of the carriage rail;

FIG. 6 is a fragmentary side sectional elevation of a modification of the FIGS. 1 and 2 construction;

FIG. 7 is a section on the line VII—VII of FIG. 6;

FIG. 8 is a section on the line VIII—VIII of FIG. 6;

FIG. 9 is a side elevation, partly in section, of a further modified construction;

FIG. 12 is a view similar to FIG. 1, showing another modification of the invention.

Figure 10:
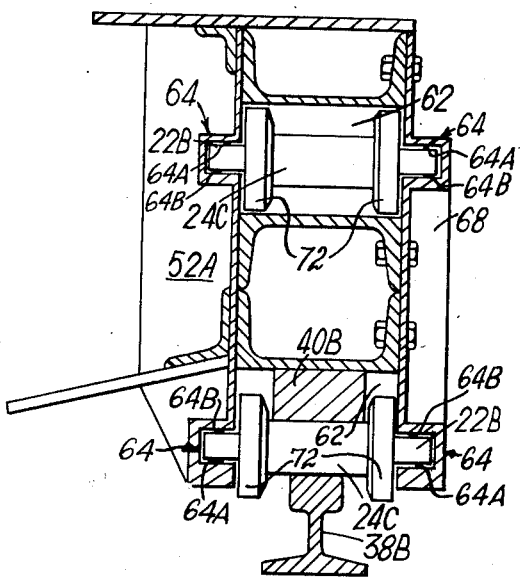
FIG. 10 is a section on the line X—X of FIG. 9.

Referring now to the drawings wherein like reference numerals denote like parts throughout the various views, and firstly to FIGS. 1 and 2 thereof, an endless chain 20 is made up from spindles 22, rollers 24, chain links 26 and 28 and nuts 30 and 32 (omitted from FIG. 1 for clarity), the rollers having side flanges 34 and 36. A static or ground rail on which the rollers run is denoted 38, and 40 denotes a rail secured to a carriage (noted as 52 in FIGS. 5, 7, and 10). In the present embodiment, there are normally two static rails 38, and an endless chain 20 and a rail 40 are provided at each side of the carriage. The endless chains are entrained about longitudinally spaced sprockets 42, one of which is driven and the other idle. A measure of side clearance or "float" is provided to allow for variations of rail gauge. Float is achieved in the present instance by making the roller landings 19 a reasonable fit on rails 40 and of a greater width, between flanges 34 and 36, than the static rail 38 as shown in FIG. 2.

When the truck is progressed over the rails 38 by rotation of the sprocket 42 which is driven, and consequent movement of the chains about their endless paths, the rollers 22 roll along between the rails 38 and 40 and in consequence, neglecting slip, the carriage rail—and hence the trucks—travels at twice the velocity of the chain with reference to a static datum. Means (not shown) is provided to maintain the spaced relationship of the rails 40 and sprockets 42 when friction forces are set up, e.g. on braking.

Referring now to FIGS. 3–5 of the drawings, the invention is shown as applied to the truck of an overhead gantry crane, or similar vehicle 52, the static rail 38 being omitted from these views and the endless chain 20 being omitted from FIGS. 4 and 5 for reasons of clarity. In this embodiment of the invention, the sprocket wheel 42A is driven and the sprocket wheel 42B is idle. The sprocket wheel 42B is mounted on bearings in a block 44 which can be positionally adjusted longitudinally by means of bolts 46 so that slack in the endless chain 20, due, for example, to spindle wear, can be taken up.

In a gantry crane, the static rails 38 are carried on a gantry structure which is subject to deflection under load, and to ensure that the rollers 24 bear on the carriage rails 40 throughout the lengths of the endless chains passing below said rails 40, each rail 40 must be sufficiently flexible to follow any deflection of the opposite static rail 38. With this in view, each carriage rail 40 is flexibly mounted in the truck 52 of the gantry crane and is held in contact with the rollers 24 by a series of springs 48 (FIGS. 4 and 5). In practice, the movement of the springs 48 would be very slight and thus the springs may have any degree of resiliency suitable for load conditions. The springs 48 are shown as a pair of "Belleville" washers, but any other form of spring would serve the purpose equally well. A return rail 50 is provided to guide the endless chain 20 and prevent the return length thereof from fouling any of the springs 48. The rollers 24 are held on rail 50 by their own weight. Rail 50 is narrower than the distance between flanges 34 and 36 and positioned sufficiently above the springs 48, etc. to prevent the flanges from jamming the running gear.

Referring specifically to FIG. 5, the carriage rail 40A is free to ride vertically in the truck 52 and is prevented by strips 54 from dropping out of position when the truck is jacked up, for example, for replacement of an endless chain 20. The rail 40A has integral shafts 56 on its upper surface and which are guided in bushes 58 to prevent the rail from tilting, the springs 48 fitting over the shafts and bearing between the rail and the bushes 58. The bushes are screwed into the truck structure and locked in position by locknuts 60.

When adjusting the suspension, the loaded vehicle would be situated on the static rails, and the bushes 58 would be screwed down to a predetermined load determined by a torque spanner or otherwise, and then locked by nuts 60.

In many applications the gantry girders are stiffer than the trucks, in which case no springing would be necessary, the trucks flexing to follow the gantry girder. Where the gantry is a discontinuous girder, considerable compressional strain would be imposed when the crane passed over column points, and spring mounting of the carriage rail would be desirable.

In the case of sleeper mounted ground rails, the converse is true, that is, the ground is more elastic than the truck, and the static rail would be compelled to follow the profile of the carriage rail. Even in this case, however, the carriage rail could, with advantage, be spring mounted towards its ends to reduce the local high loadings in this vicinity.

FIGS. 6, 7 and 8 illustrate a modification of the FIGS. 1 and 2 construction wherein the rollers 24A and 24B are unflanged, and guidance on the rails 38 and 40 is ensured by the links 26 and 28, the depth of which measured from the roller axes is greater than the radius of the rollers. In this modification there is also shown the application of two rollers per chain pitch, rollers 24B (FIG. 8) being carried between adjacent links 28 in addition to the rollers 24A carried on the spindles 22. A multiplicity of rollers 24 may be carried on each link, and all or some of these may be flanged as illustrated in FIG. 2 with sprocket 42C being suitably modified.

In each of the embodiments described, the sprockets 42 are arranged at such a height that the rollers on the sprocket are out of contact with the static rail 38. The idle sprocket could be replaced by a non-rotating guide, such as 69 of FIG. 9, around which the rollers can roll.

Where foreign bodies, such as slag or sand for example, are on a rail track, it is well known that a large diameter wheel is more effective than a small diameter wheel in riding over and crushing the obstructions thereby afforded. In order to assimilate large diameter wheel conditions, and referring now specifically to FIG. 12, the guide rails 40 secured to the carriage are beveled on their undersides at the leading ends thereof as shown at 41 to simulate a large radius. Thus the chain 20 and rollers 24 approach the static rail 38 gradually and, as a result, any foreign body on the static rail is progressively reduced as each succeeding roller passes over it. The principle of beveling the guide rails on their undersides at the leading ends thereof can be applied to all embodiments of the invention herein described.

Referring now to the modification shown in FIGS. 9 and 10, the carriage body 52A has profiled thereinto a chase 62 and axle races 64, the chase being wider and deeper than the races. The axle races 64 describe parallel closed loci, each locus comprising two semi-circles 64A connected by horizontal straight lines 64B. The chase 62 describes the same locus intermediate the axle races 64, but penetrates the carriage body 52A at its lower edge and is incomplete along the whole lower edge. A series of rollers 24C are located in the chase 62 and these rollers are completely embraced except along the lower straight portion of the chase where they are exposed. A carriage rail 40B bears along the top of the rollers 24B. A removable panel 66 gives access to the chase for removal and replacement of rollers. The rollers 24C have axles 22B which are guided in the axle races 64 and are in general constrained in the chase 62, the axles 22B ensuring that the rollers do not come free along the bottom straight portion of said chase.

The rollers 24C carry the load between the carriage rail 40B and the static rail 38B on roller landings 19A. The axle races 64 have sufficient clearance to prevent any load coming between the roller axles 22B and the races when the rollers are load-carrying. A completely removable panel 68 is provided, which on removal exposes to view the totality of the rollers 24C and gives access for inspection and maintenance of the roller chase 62. The panel 68 can be removed without jacking up the carriage.

Figure 11:
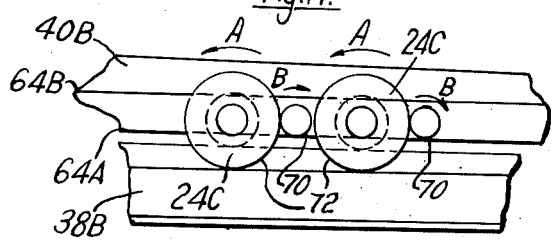
FIG. 11 is a detail view showing another modification of the invention.

In the modification illustrated schematically in FIG. 11, smaller rollers 70 are disposed between successive rollers 24C of the series. The rollers 70 do not contact the rails 38B and 40B and are guided in the axle races 64 only. Under normal conditions the rollers 70 revolve in the opposite direction to the rollers 24C as indicated by the arrows A and B, serve as spacer elements to keep the flanges 72 of the main rollers 24C out of contact with one another thus to obviate frictional abrasion between such flanges.

The embodiments of the invention described with reference to FIGS. 9 to 11 may concern non-driven vehicles and could be applied, for example, to a rope-hauled vehicle or a vehicle with independent propulsion such as rack and pinion, or may concern non-driven load-carrying stations of an otherwise driven vehicle.

I claim:
1. In combination with a rail mounted vehicle, a truck comprising a chassis and propulsion means, comprising at least two longitudinally spaced sprocket means mounted on said chassis, at least one of said sprocket means being driven, a carriage rail, means for resiliently mounting said carriage rail beneath said chassis, a return rail mounted above said chassis, a plurality of links, a plurality of shafts interconnecting adjacent lings in overlapping arrangement forming a pair of parallel spaced endless chains, a plurality of roller means each being freely rotatably mounted on one of said shafts, said chain seating said rollers in said sprockets and said rollers bearing on the lower part of said carriage rail and the upper portion of said return rail.

2. A rail mounted vehicle according to claim 1 wherein said rollers have flanges on their ends, said flanges providing a means for guiding said rollers against lateral deviation relative to said rails.

3. A rail mounted vehicle according to claim 1 wherein said links have a depth which is greater than the radius of said rollers, said chain guiding said rollers against lateral deviation on said rails.

4. A rail mounted vehicle according to claim 1 wherein at least one roller is freely rotatably mounted on said links intermediate of said shafts.

References Cited by the Examiner

UNITED STATES PATENTS

| | | | |
|---|---|---|---|
| 534,442 | 2/95 | Linn | 305—8 |
| 993,037 | 5/11 | Cyr | 305—52 X |
| 1,204,799 | 11/16 | Luce | 305—52 |
| 1,345,818 | 7/20 | Witt | 305—52 |
| 1,478,321 | 12/23 | Berkel | 305—17 |
| 1,686,382 | 10/28 | Johnson et al. | 104—137 |
| 1,766,538 | 6/30 | Prescott | 104—137 |
| 2,117,790 | 5/38 | Cowles | 104—137 |
| 2,867,480 | 1/59 | Cushman | 305—18 |
| 3,029,086 | 4/62 | Stokvis | 305—16 X |

FOREIGN PATENTS

| | | |
|---|---|---|
| 373,190 | 7/39 | Italy. |
| 126,686 | 5/19 | Great Britain. |

ARTHUR L. LA POINT, *Primary Examiner.*

LEO QUACKENBUSH, MILTON BUCHLER,
*Examiners.*